(12) United States Patent
Buhrke

(10) Patent No.: US 11,130,375 B2
(45) Date of Patent: Sep. 28, 2021

(54) ROTARY UNION FOR A TIRE-INFLATION SYSTEM

(71) Applicant: Deere & Company, Moline, IL (US)

(72) Inventor: Frank Buhrke, Birkenau (DE)

(73) Assignee: DEERE & COMPANY, Moline, IL (US)

( * ) Notice: Subject to any disclaimer, the term of this patent is extended or adjusted under 35 U.S.C. 154(b) by 469 days.

(21) Appl. No.: 16/007,469

(22) Filed: Jun. 13, 2018

(65) Prior Publication Data

US 2019/0009622 A1    Jan. 10, 2019

(30) Foreign Application Priority Data

Jul. 6, 2017   (DE) .......................... 102017211574.2

(51) Int. Cl.
*B60C 23/00* (2006.01)
*B60B 27/02* (2006.01)
*B60S 5/04* (2006.01)

(52) U.S. Cl.
CPC ...... *B60C 23/003* (2013.01); *B60C 23/00309* (2020.05); *B60C 23/00345* (2020.05);
(Continued)

(58) Field of Classification Search
CPC ........ B60C 23/00347; B60C 23/00309; B60C 23/003; B60C 23/00345; B60C 23/00336; B60C 23/001; B60C 23/02
See application file for complete search history.

(56) References Cited

U.S. PATENT DOCUMENTS 3,362,452 A * 1/1968 Harnish .................. B64C 25/36
                                                         152/416
4,470,506 A * 9/1984 Goodell ................ B60C 23/003
                                                         152/416
(Continued)

FOREIGN PATENT DOCUMENTS

DE    102013207855 A1 * 10/2014 ........... B60C 23/003
DE    102013207855 A1    10/2014
(Continued)

OTHER PUBLICATIONS

German Search Report issued in counterpart application No. 102017211574.2 dated Mar. 28, 2018. (10 pages).
(Continued)

*Primary Examiner* — Scott A Browne

(57) ABSTRACT

A rotary union for a tire inflation system includes an axle housing and a wheel axle rotatably mounted in the axle housing. The wheel axle has a flange for attachment of a wheel rim. The wheel axle is received by a passage socket that is connected for conjoint rotation to the wheel axle and supported by a radial bearing relative to a bearing seat within the axle housing. A compressed air duct is disposed inside a cylindrical wall of the passage socket such that the compressed air duct is connected at one end to a pressure connector mounted on the axle housing and at the other end to a tire connector mounted on the passage socket. The passage socket is sealed rotationally movably with respect to an adjacent inner side of the axle housing such that an enclosed chamber is formed between the pressure connector and the compressed air duct.

22 Claims, 3 Drawing Sheets

(52) U.S. Cl.
CPC ........ *B60C 23/00347* (2020.05); *B60B 27/02* (2013.01); *B60C 2200/08* (2013.01); *B60S 5/043* (2013.01)

(56) References Cited

U.S. PATENT DOCUMENTS

| | | | | |
|---|---|---|---|---|
| 4,582,107 | A * | 4/1986 | Scully | B60C 23/007 |
| | | | | 152/415 |
| 5,174,839 | A * | 12/1992 | Schultz | B60C 23/003 |
| | | | | 152/415 |
| 5,236,028 | A * | 8/1993 | Goodell | B60C 23/003 |
| | | | | 152/417 |
| 5,253,688 | A * | 10/1993 | Tigges | B60C 23/003 |
| | | | | 152/417 |
| 6,145,558 | A * | 11/2000 | Schmitz | B60C 23/003 |
| | | | | 152/416 |
| 6,199,611 | B1 * | 3/2001 | Wernick | B60C 23/003 |
| | | | | 152/417 |
| 6,439,044 | B1 | 6/2002 | Tigges | |
| 6,719,028 | B2 * | 4/2004 | D'Amico | B60C 23/003 |
| | | | | 152/415 |
| 10,035,384 | B2 * | 7/2018 | Keeney | B60C 23/003 |
| 10,562,358 | B2 * | 2/2020 | Baum | B60C 23/003 |
| 2002/0112802 | A1 * | 8/2002 | D'Amico | B60C 23/003 |
| | | | | 152/415 |
| 2007/0122071 | A1 * | 5/2007 | Ohtsuki | B60B 35/121 |
| | | | | 384/589 |

FOREIGN PATENT DOCUMENTS

| | | |
|---|---|---|
| DE | 102016203689 A1 | 9/2017 |
| EP | 3164273 A1 | 5/2017 |
| GB | 702621 A | 1/1954 |
| WO | 2016001349 A1 | 1/2016 |

OTHER PUBLICATIONS

European Search Report issued in counterpart application No. 18181687.7 dated Nov. 6, 2018. (8 pages).

\* cited by examiner

ROTARY UNION FOR A TIRE-INFLATION SYSTEM

RELATED APPLICATIONS

This application claims priority to German Patent Application Ser. No. 102017211574.2, filed Jul. 6, 2017, the disclosure of which is hereby incorporated by reference in its entirety.

FIELD OF THE DISCLOSURE

The present disclosure relates to a rotary union for a tire-inflation system.

BACKGROUND

A rotary union is known from U.S. Pat. No. 5,253,688A, for example. The rotary union surrounds a wheel axle, rotationally mounted inside an axle body, and includes two annular bodies mounted concentrically relative to one another, between which a circumferential annular gap is formed. This annular gap is subdivided by means of associated seals into two separate connecting chambers, each being used to supply compressed air via connecting lines. The inner annular body is connected for conjoint rotation to the wheel axle and the outer annular body is connected for conjoint rotation to an outer end face of the axle body.

Due to the exterior arrangement of the annular bodies, the rotary union is subjected to comparatively high bending stresses by the wheel axle, which leads to premature wear on the seals arranged in the annular gap and thus can ultimately lead to operational failures of the rotary union.

There is a need therefore for an improved rotary union with regard to operating safety.

SUMMARY

In one embodiment of the present disclosure, a rotary union for a tire inflation system includes an axle housing and a wheel axle rotatably mounted in the axle housing and having a wheel mounting flange for attachment of a wheel rim, wherein the wheel axle is received at least in portions by a passage socket that is connected for conjoint rotation to the wheel axle and is supported by means of a radial bearing relative to a bearing seat within the axle housing. A compressed air duct running inside a cylindrical wall of the passage socket is provided and is connected at one end to a pressure connector mounted on the axle housing and at the other end to a tire connector mounted on the passage socket. The passage socket is sealed rotationally movably with respect to an adjacent inner side of the axle housing in such a manner that an air-tightly enclosed connecting chamber is formed between the pressure connector and the compressed air duct.

Bending stresses from the wheel axle that act on the rotary union can be effectively reduced because of the radial support of the passage socket within the axle housing. This leads to reduced wear of the rotationally movable seal provided between the passage socket and the axle housing, and thus to a corresponding improvement of the operating safety of the rotary union.

To minimize the bending torques acting on the rotary union, it is advantageous if the bearing seat inside the axle housing is arranged as far outward as possible relative to the position of the rotationally movable seal, i.e., in the direction of the wheel fastening flange.

The rotationally movable seal prevents an uncontrolled escape of compressed air from the axle housing or the connecting chamber into the environment. An elastic seal ring, which is inserted into an annular gap between a cylindrical outer side of the passage socket and the cylindrical inner side of the axial housing, is typically used to produce the rotationally movable sealing.

The connecting chamber is formed as a cavity within the axle housing, which is produced as a cast steel part. In particular, the cavity adjoins an inner end face of the passage socket, wherein the compressed air duct can be formed as a longitudinal bore opening into the cavity at the inner end face of the passage socket. An additional bearing seat can adjoin the cavity in order to receive an additional radial bearing that is used for internal support of the wheel axle relative to the axle housing.

Proceeding from the cavity, the passage socket can extend in the direction of an exterior end face of the axle housing and can have a protective outer collar there. The outer collar is an integral component of the passage socket, which is produced as a cast steel part.

It is also possible to attach an additional pressure connector to the axle housing, the additional pressure connector opening into an annular channel communicating with the compressed air duct and formed by an elastic seal ring pair running between a cylindrical outer side of the passage socket and the cylindrical inner side of the axle housing. The elastic seal ring pair is retained in its designated position by means of associated securing rings, which engage with circumferential grooves along the cylindrical outer side of the passage socket, for example.

The compressed air connector can be a venting connector for discharging air from a vehicle tire connected to the tire connector and the additional pressure connector can be an air supply connector for filling the vehicle tire with compressed air from a compressor comprised by the tire inflation system.

In order to increase the speed when inflating the vehicle tire, multiple or additional compressed air ducts running inside the cylindrical wall of the passage socket can be provided, in which case each of the compressed air ducts is associated with a separate further pressure connector and/or tire connector. Each of the additional pressure connectors opens into a separate annular channel communicating with the compressed air duct in question. The annular channels are each separated from one another by associated elastic seal ring pairs. The compressed air ducts can be connected in parallel when inflating the vehicle tire so that correspondingly high flow rates can be achieved. On the other hand, it is also possible for a first tire connector to be connected via a pneumatic valve mounted on a wheel rim to the vehicle tire and for a second tire connector to be connected to a control input of the pneumatic valve. The use of such a pneumatic valve is common in most conventional tire inflation systems. In this way, possible compatibility problems can be avoided if the rotary union is retrofitted.

To keep structural weakening of the passage socket to a minimum, the compressed air ducts can be distributed uniformly along the periphery of the cylindrical wall of the passage socket.

The tire connector can be mounted easily accessible from the exterior in an outer collar formed on the passage socket. In particular, the tire connector is inclined at an angle of 30 to 60° relative to the extent of the compressed air duct for this purpose. An inclined bore opening into the longitudinal bore within the outer collar establishes a connection to the tire connector.

The connectors are typically ordinary hose connection fittings, which are screwed into threaded receptacles formed on the axle housing and the passage socket or the outer collar thereof.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
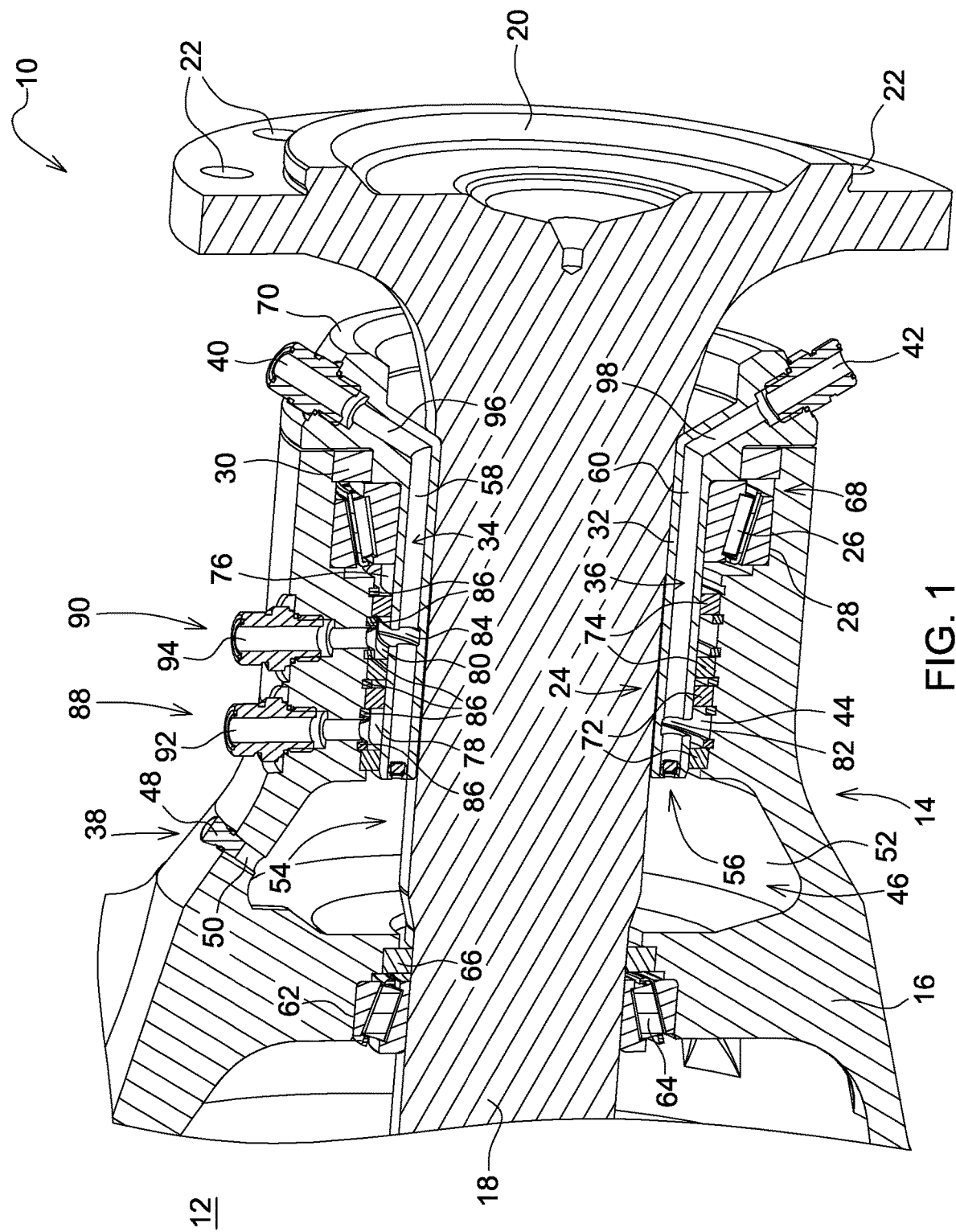
FIG. 1 shows a cross sectional view of an embodiment of a rotary union for a tire inflation system.

FIG. 1 shows a cross sectional view of an embodiment of a rotary union according to one embodiment for a tire inflation system.

The rotary union 10 in the present embodiment is a component of an axle tube 14 mounted on a rear axle differential 12 of an agricultural tractor, not shown.

The rotary union 10 includes an axle housing 16 and a wheel axle 18, a rear axle in the present example, rotatably mounted in the axle housing 16. The wheel axle 18 has a wheel mounting flange 20 having a plurality of fastening threads 22, at which a wheel rim having a tire situated thereon (not shown) can be attached by means of associated bolts. The wheel mounting flange 20 is an integral component of the wheel axle 18 according to the present embodiment, but a two-part design can also be provided, in which the wheel mounting flange 20 is movably arranged along the wheel axle 18 by means of a rack-and-pinion drive (a so-called rack-and-pinion axle).

The wheel axle 18 is accommodated at least in portions by a passage socket 24 connected for conjoint rotation to the wheel axle 18. The two parts are connected frictionally and form-fittingly, i.e., air tightly, to one another, which can be accomplished by press-joining or shrink-fitting the passage socket 24 onto the wheel axle 18.

The passage socket 24 is supported by means of a radial bearing 26 relative to a bearing seat 28 arranged inside the axle housing 16 in the direction of the wheel mounting flange 20. An elastic seal ring 30 prevents undesired penetration of moisture and/or dirt into the radial bearing 26, designed as a conical rolling bearing.

In addition, first and second compressed air ducts 34, 36 running inside a cylindrical wall 32 of the passage socket 24 are provided and communicate at one end with a pressure connector 38 mounted on the axle housing 16 and at the other with first and second tire connectors 40, 42 mounted on the passage socket 24. The two compressed air ducts 34, 36 are arranged opposite one another along the periphery of the cylindrical wall 32 of the passage socket 24.

More precisely, the passage socket 24, as is clear from the subsequent description in detail, is sealed in a rotationally movable manner with respect to an adjoining cylindrical inner side 44 of the axle housing 16 such that an air-tightly closed-off connecting chamber 46 is formed between the common pressure connector 38 and the two compressed air ducts 34, 36.

Figure 2:
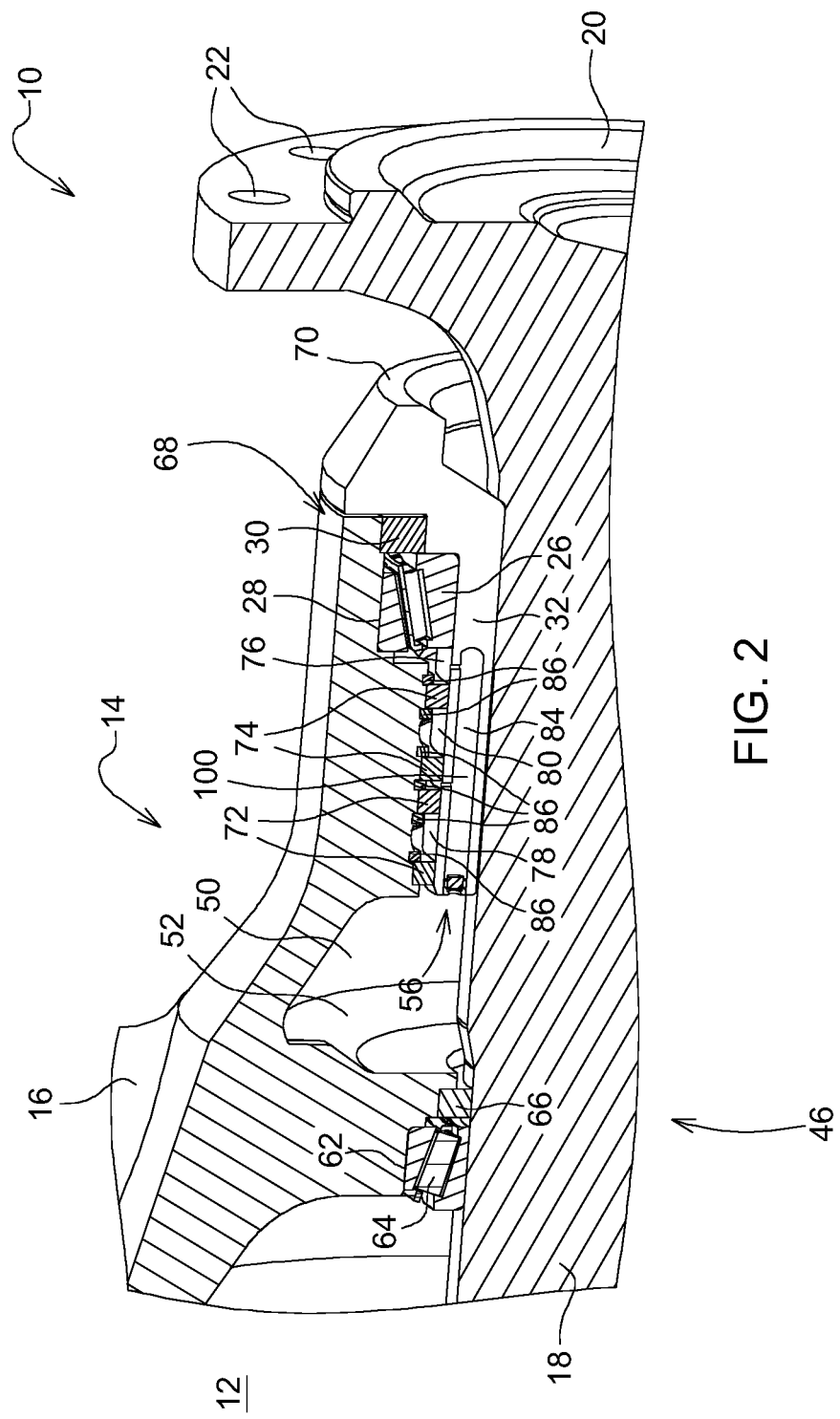
FIG. 2 shows the rotary union according to FIG. 1 rotated by 90°.

The common pressure connector 38, designed as a venting connector 48, is screwed in the form of a corresponding hose connector fitting into a threaded receptacle formed in the axle housing 16 that transitions into a through-bore 50 opening into the connecting chamber 46. This can best be seen from the representation of the rotary union 10 rotated by 90° as shown in FIG. 2.

The connecting chamber 46 is formed as a cavity 52 inside the axle housing 16, produced as a cast steel part, and surrounds a free portion 54 of the wheel axle 18 in a toroidal shape. The cavity 52 adjoins an inner end face 56 of the passage socket 24, the two compressed air ducts 34, 36 being formed as longitudinal bores 58, 60 opening into the cavity 52 at the inner end face 56 of the passage socket 24. The cavity 52 is adjoined by an additional bearing seat 62 for receiving an additional wheel bearing 64, which is likewise constructed as a conical rolling-contact bearing and serves as internal support of the wheel axle 18 relative to the axle housing 16. An additional elastic seal ring 66 prevents escape of compressed air into neighboring regions of the axle housing 16.

Proceeding from the cavity 52, the passage socket 24 extends in the direction of an exterior end face 68 of the axle housing 16 and has an outer collar 70 there. The outer collar 70 is an integral component of the passage socket 24, which is produced as a cast steel part.

For rotationally movable sealing of the passage socket 24 relative to the adjoining cylindrical inner side 44 of the axle housing 16, first and second elastic seal ring pairs 72, 74 are used, for example, the latter running between a cylindrical outer side 76 of the passage socket 24 and the cylindrical inner side 44 of the axle housing 16 and forming first and second annular channels 78, 80 separated from one another, each communicating with one of the two compressed air ducts 34, 36 via associated connecting bores 82, 84. The two elastic seal ring pairs 72, 74 are retained in their intended position by means of associated securing rings 86, which engage in circumferential grooves along the cylindrical outer side 76 of the passage socket 24. First and second additional pressure connectors 88, 90, which open into a respective one of the two annular channels 78, 80 and form associated air supply connectors 92, 94, are mounted on the axle housing 16. The air supply connectors 92, 94 take the form of corresponding hose connector fittings screwed into threaded receptacles that are formed one next to another in the axle housing 16.

The two tire connectors 40, 42, which are easily accessible from the outside, are correspondingly mounted in the outer collar 70 formed on the passage socket 24. Each of the two tire connectors 40, 42 is inclined at an angle of about 45° relative to the extent of the associated longitudinal bore 58, 60 of the compressed air duct 34, 36. The tire connectors 40, 42 take the form of corresponding hose connector fittings screwed into threaded recesses formed in the outer collar 70. An inclined bore 96, 98 opening into the respective longitudinal bore 58, 60 within the outer collar 70 establishes a connection to the associated tire connector 40, 42.

To summarize, the rotationally movable sealing established by means of the two elastic seal ring pairs 72, 74 makes it possible for the passage socket 24 to rotate jointly with the wheel axle 18 freely inside the axle housing 16, and at the same time a continuous air exchange connection is established via the respective compressed air duct 34, 36 between the venting and air supply connectors 48, 92, 94 on the one hand and the tire inflation connectors 40, 42 on the other.

Further details of the passage socket 24 are presented in FIG. 2. It shows one of two opposing blind holes 100 running inside the cylindrical wall 32, which establish a pressure compensation connection between the cavity 52 and a region surrounding the radial bearing 26.

Figure 3:
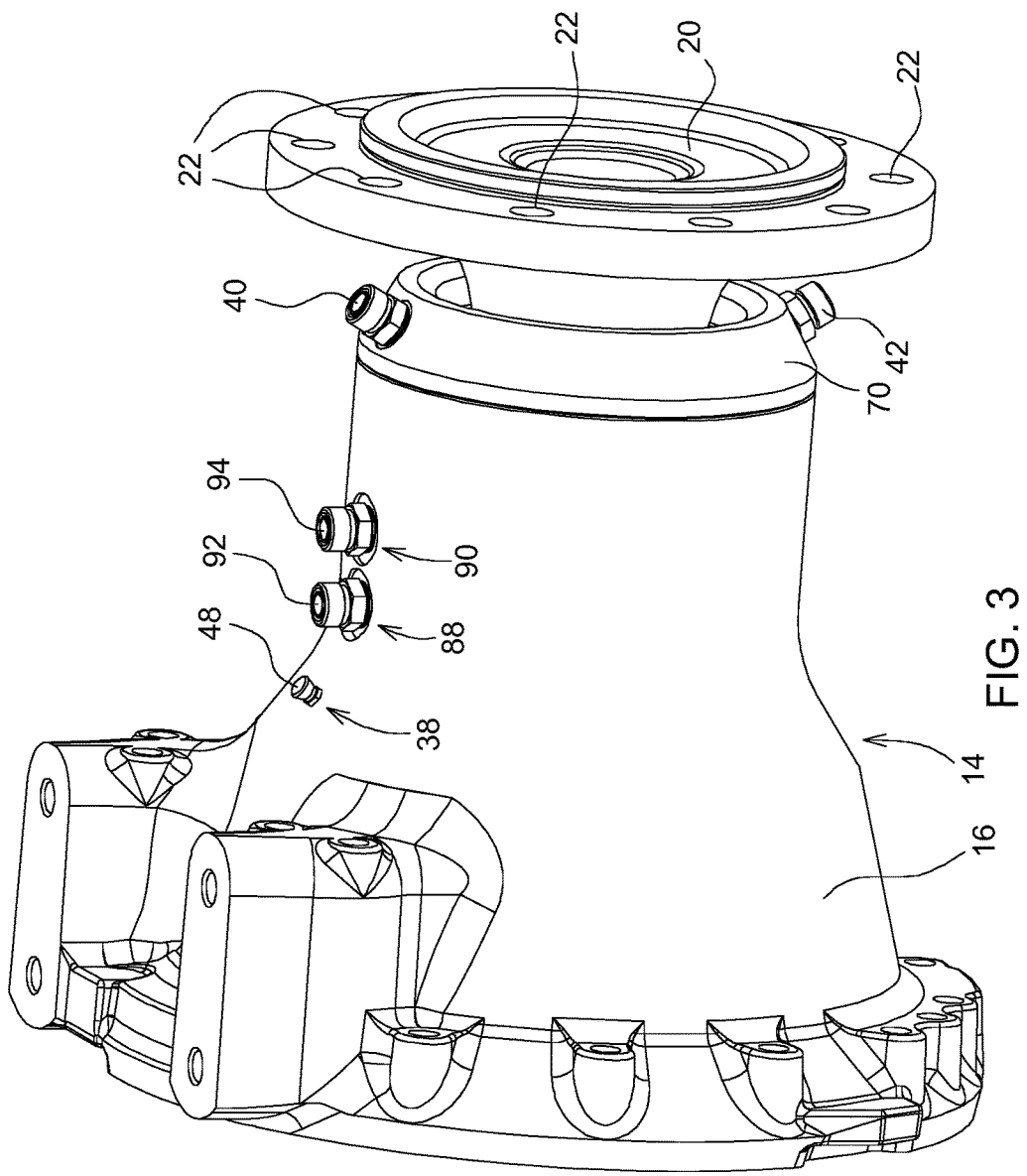
FIG. 3 shows an exterior view of an axle housing accommodating the rotary union according to FIG. 1.

FIG. 3 shows an external view of the axle housing 16 accommodating the rotary union 10. In the installed condition on the agricultural tractor, the venting and air supply connectors 48, 92, 94 of the rotary union 10 are connected via pressure hoses, not shown, to the tire inflation system. Additional pressure hoses establish a connection between the tire inflation connectors 40, 42 and the vehicle tire or an internal volume bounded by the tire and the wheel rim. To reduce the tire inflation pressure, air is released from the vehicle tire via the venting connector 48. Conversely, the vehicle tire is filled with air from a compressor comprised by the tire inflation system via the two air supply connectors 92, 94 in order to increase the tire inflation pressure. The tire inflation system or a valve arrangement comprised thereby is appropriately actuated by a control device provided in the agricultural tractor. A possible structural implementation of the tire inflation system is disclosed in DE 10 2016 203 689 A1, for example.

For the sake of completeness, it should be noted that the rotary union can also be arranged on a front axle of the agricultural tractor. In place of an agricultural tractor, any other utility vehicle can also be used, for example, an agricultural vehicle of any design, or a construction or forestry machine.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A rotary union for a tire inflation system, comprising:
an axle housing;
a wheel axle rotatably mounted in the axle housing, the wheel axle having a wheel mounting flange for attachment of a wheel rim,
wherein the wheel axle is received at least in portions by a passage socket that is connected for conjoint rotation to the wheel axle and supported by a radial bearing relative to a bearing seat within the axle housing,
wherein a compressed air duct is disposed inside a cylindrical wall of the passage socket, the compressed air duct being connected at one end to a pressure connector mounted on the axle housing and at the other end to a tire connector mounted on the passage socket,
wherein the passage socket is sealed rotationally movably with respect to an adjacent inner side of the axle housing in such a manner that an air-tightly enclosed connecting chamber is formed between the pressure connector and the compressed air duct;
wherein the connecting chamber is formed as a cavity inside the axle housing and the cavity adjoins an inner end face of the passage socket.

2. The rotary union of claim 1, wherein the cavity surrounds the wheel axle.

3. The rotary union of claim 2, wherein, proceeding from the cavity, the passage socket extends in a direction of an exterior end face of the axle housing.

4. The rotary union of claim 1, further comprising an additional pressure connector mounted on the axle housing.

5. The rotary union of claim 4, wherein the additional pressure connector opens into an annular channel communicating with the compressed air duct and is formed by an elastic seal ring pair between a cylindrical outer side of the passage socket and a cylindrical inner side of the axle housing.

6. The rotary union of claim 5, further comprising an additional compressed air duct running inside the cylindrical wall of the passage socket.

7. The rotary union of claim 6, wherein each of the compressed air ducts is associated with the separate additional pressure connector or tire connector.

8. The rotary union of claim 6, wherein the compressed air ducts are arranged equally along a periphery of the cylindrical wall of the rotary passage socket.

9. The rotary union of claim 1, wherein the tire connector is mounted on an outer collar formed on the passage socket.

10. A tire inflation system for adjusting a tire inflation pressure present in a vehicle tire, comprising:
a rotary union including an axle housing;
a wheel axle rotatably mounted in the axle housing, the wheel axle having a wheel mounting flange for attachment of a wheel rim,
wherein the wheel axle is received at least in portions by a passage socket that is connected for conjoint rotation to the wheel axle and supported by a radial bearing relative to a bearing seat within the axle housing,
wherein a compressed air duct is disposed inside a cylindrical wall of the passage socket, the compressed air duct being connected at one end to a pressure connector mounted on the axle housing and at the other end to a tire connector mounted on the passage socket,
wherein the passage socket is sealed rotationally movably with respect to an adjacent inner side of the axle housing in such a manner that an air-tightly enclosed connecting chamber is formed between the pressure connector and the compressed air duct;
wherein the connecting chamber is formed as a cavity inside the axle housing and the cavity adjoins an inner end face of the passage socket.

11. The tire inflation system of claim 10, wherein the cavity surrounds the wheel axle.

12. The tire inflation system of claim 11, wherein, proceeding from the cavity, the passage socket extends in a direction of an exterior end face of the axle housing.

13. The tire inflation system of claim 10, further comprising an additional pressure connector mounted on the axle housing.

14. The tire inflation system of claim 13, wherein the additional pressure connector opens into an annular channel communicating with the compressed air duct and is formed by an elastic seal ring pair between a cylindrical outer side of the passage socket and a cylindrical inner side of the axle housing.

15. The tire inflation system of claim 14, further comprising an additional compressed air duct running inside the cylindrical wall of the passage socket.

16. The tire inflation system of claim 15, wherein each of the compressed air ducts is associated with the separate additional pressure connector or tire connector.

17. The tire inflation system of claim 15, wherein the compressed air ducts are arranged equally along a periphery of the cylindrical wall of the rotary passage socket.

18. The tire inflation system of claim 10, wherein the tire connector is mounted on an outer collar formed on the passage socket.

19. A rotary union for a tire inflation system, comprising:
an axle housing;
a wheel axle rotatably mounted in the axle housing, the wheel axle having a wheel mounting flange for attachment of a wheel rim,
a passage socket connected for conjoint rotation to the wheel axle and supported by a radial bearing relative to a bearing seat within the axle housing, and
a plurality of compressed air ducts disposed inside a cylindrical wall of the passage socket, the plurality of compressed air ducts being connected at one end to a pressure connector mounted on the axle housing and at the other end to a tire connector mounted on the passage socket,
wherein the passage socket is sealed rotationally movably with respect to an adjacent inner side of the axle housing in such a manner that an air-tightly enclosed connecting chamber is formed between the pressure connector and the compressed air duct,
wherein the connecting chamber is formed as a cavity inside the axle housing, the cavity adjoins an inner end face of the passage socket, and the cavity surrounds the wheel axle in a toroidal shape,
wherein at least one of the plurality of pressure connectors opens into an annular channel communicating with the compressed air duct and is formed by an elastic seal ring pair between a cylindrical outer side of the passage socket and a cylindrical inner side of the axle housing.

20. The rotary union of claim 19, wherein the compressed air ducts are arranged equally along a periphery of the cylindrical wall of the rotary passage socket.

21. The rotary union of claim 1, wherein the cavity surrounds the wheel axle in a toroidal shape.

22. The tire inflation system of claim 10, wherein the cavity surrounds the wheel axle in a toroidal shape.

* * * * *